Sept. 4, 1928.
A. THOMA
1,682,865
SHOE BOTTOM FILLING MACHINE
Filed Nov. 1, 1924
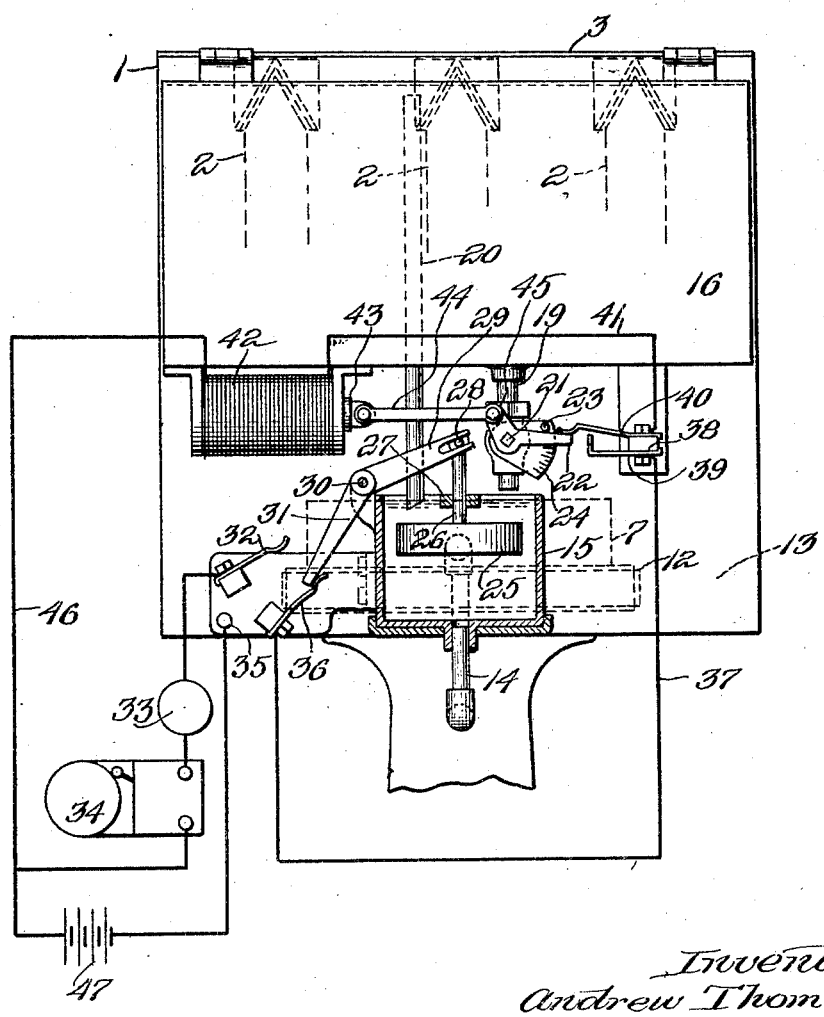
Inventor:
Andrew Thoma,
by Geo. H. Maxwell
atty.

Patented Sept. 4, 1928.

1,682,865

UNITED STATES PATENT OFFICE.

ANDREW THOMA, OF CAMBRIDGE, MASSACHUSETTS, ASSIGNOR TO NORTH AMERICAN CHEMICAL COMPANY, OF BOSTON, MASSACHUSETTS, A CORPORATION OF MASSACHUSETTS.

SHOE-BOTTOM-FILLING MACHINE.

Application filed November 1, 1924. Serial No. 747,275.

My invention refers to the type of apparatus disclosed in Patent 1,512.229 and in application Serial No. 633,148 and is subordinate to the application of George H. Maxwell, Serial No. 747,273 concurrently filed herewith. As explained at length in the last mentioned application, the automatic water supply in this type of machine is apt to run dry so that the steam generator fails to deliver steam to the filler in the reservoir and is liable itself to be ruined by the continued high heat and also the filler is ruined and sometimes the entire machine ruined. My present invention aims to render these dire results impossible. To this end I provide automatic means, preferably in the form of a float in the sealing cup, for giving an alarm either audible or visible or both when the water supply ceases or falls to the point of danger. Also it sometimes happens that the water supply floods the apparatus, especially when the machine starts up cold in the morning, and accordingly I provide automatic means for shutting off the water supply whenever the water level in the sealing cup rises unduly or overflows.

In the drawings in which I have shown my invention largely diagrammatically the drawing shows the machine in rear end elevation and section partly broken away and partly in diagram.

The reservoir 1, heating flue 2, cover 3, work-basin 5, slide door 6, steam generator 7, heater 12, chamber 13, water supply pipe 14, sealing cup 15, water tank 16, water pipe supply or drip 19, and air pipe 20, may be and preferably are the same as shown and described in the concurrently filed application Serial No. 747,273 of George H. Maxwell. The tube or water-outlet 19 has a valve or pet cock 21, in the preferred form as herein shown, whose handle or thumb lever 22 extends to the right in the drawings against a stop 23 when in closed position and is shifted or adjusted over a feed gage 24 for open position. This latter is of great convenience to the operator as it enables the operator definitely to adjust the drip or flow of moisture according to his speed. I have found that different operators necessarily require different amounts of steam in accordance with their speed ability in filling shoe bottoms. This gage is one means of enabling the operator to adjust the machine more intelligently and accurately so as to tend to prevent the two extremes of flooding the filler in the machine on the one hand and running dry on the other hand. In any suitable place, preferably in the feed-cup 15, I provide a float 25 whose stem 26 passes through a guide spider 27 in the upper end of the cup and engages at 28 a lever 29 pivoted at 30 whose opposite end 31 constitutes a make and break device. A contact 32 shown as above said end 31 is in position to be closed by the falling of the float, thereby rendering active the alarm circuit which includes a light signal 33 and a bell signal 34 said circuit grounding at 35 on the cup or any other convenient and suitable ground. Below said lever end 31, as herein shown, is a contact 36 in a circuit whose wire 37 connects at 38 with one side 39 of a circuit breaker whose opposite contact 40 connects through the wire 41 to a solenoid 42 whose core 43 connects by a link 44 to the angle arm or upstanding portion 45 of the valve handle 22. Said solenoid connects by a wire 46 through the battery or source of electric supply 47 to the ground 35.

In use the operator turns on the valve 21 to the extent which his experience has demonstrated is correct for his ability, this point being conveniently indicated by the gage 24, and holds the same until the cup and apparatus has filled to the point which leaves the float 25 midway between the two contacts 32 and 36. If the machine is running in the normal manner and the operator maintains his usual speed of filling shoe-bottoms the float will remain in this position. When however the float for any reason rises it causes the lever end 31 to close the contact at 36 and thereby operate the solenoid 42 to shut off the water. This result is secured through the circuit 36, 38, 40, 41, 42, 46, 47, 35, 29, 31. As the valve lever 22 reaches closed position and is approaching the stop 23 it breaks the circuit at 39, 40 thereby leaving the parts in closed position. This is of advantage as it compels the operator to give attention to the machine before he can resume operations.

If on the other hand the float 25 falls for any reason it operates through its connections 26, 29 and 31 to close the circuit at 32 and cause the light signal 33 to glow and the audible signal 34 to sound. This gives the requisite protective warning to cause the operator to cut off his heat current or give other required attention to the machine.

It will be understood that my invention is capable of a wide variety of embodiment within the spirit and scope of the invention and that various combinations and subcombinations come within its scope.

My invention is further defined in the form of claims as follows:

1. In a machine of the kind described, a filler supply reservoir for the safe handling with high heat of a heat responsive shoe-bottom filler which is normally slowly penetrative by heat and liable to burn at high heat, a steam generator connected to deliver heat and moisture to said filler in the reservoir, means for supplying heat to the generator at a substantially uniform rate, means for maintaining a substantially constant water level in the generator, said latter means comprising a receptacle freely communicating with the generator, a valve normally set to deliver water to said receptacle at substantially the same rate at which water is evaporated by the generator, a float in the receptacle, and operating connections between the float and inlet valve so constructed and arranged that upon failure of the generator to evaporate water at the rate at which water is normally supplied to the receptacle, the valve will be closed by the abnormal upward movement of the float, said valve being unaffected upon the subsequent downward movement of the float, whereby the water supply will be automatically cut off upon a flow of water in excess of the capacity of the machine but requires a separate operation independent of the float to turn the water on again.

2. In a machine of the kind described, a filler supply reservoir for the safe handling with high heat of a heat responsive shoe-bottom filler which is normally slowly penetrative by heat and liable to burn at high heat, a steam generator connected to deliver heat and moisture to said filler in the reservoir, means normally supplying water to the generator at such a rate as to maintain a substantially constant predetermined water level in the latter, said means including an inlet valve, a signal, a float which is idle at said normal predetermined level, operating connections between the float and inlet valve adapted to close the valve upon an excessive upward movement of the float but to leave the valve unaffected upon the downward movement of the float, and operating connections between the float and the signal adapted to operate the signal upon an excessive downward movement of the float and to cut off the signal upon the return of the float to normal position.

3. In a machine of the kind described, a filler supply reservoir for the safe handling with high heat of a heat responsive shoe-bottom filler which is normally slowly penetrative by heat and liable to burn at high heat, a steam generator connected to deliver heat and moisture to said filler in the reservoir, a water supply for maintaining said steam generator supplied with water including an inlet valve and a float for closing the valve and manual adjusting means by which the operator may open or close the inlet valve or set it for any predetermined flow independently of the float, and operating connections between said float and inlet valve adapted to close the valve upon an excessive upward movement of the float but to leave the valve unaffected upon the downward movement of the float.

4. In a machine of the kind described, a filler supply reservoir for the safe handling with high heat of a heat responsive shoe-bottom filler which is normally slowly penetrative by heat and liable to burn at high heat, a steam generator connected to deliver heat and moisture to said filler in the reservoir, means for maintaining a substantially constant predetermined water level in the generator, said means comprising a receptacle communicating with the generator, an inlet valve normally set to deliver water at a predetermined rate to said receptacle, a signal, a float within said receptacle, said float being idle at normal or intermediate level in the receptacle, electrical mechanism operable only upon an abnormal upward movement of the float to close the inlet valve, and electrical mechanism operable only upon an abnormal downward movement of the float to operate the signal.

5. In a machine of the kind described, a filler supply reservoir for the safe handling with high heat of a heat responsive shoe-bottom filler which is normally slowly penetrative by heat and liable to burn at high heat, a steam generator connected to deliver heat and moisture to said filler in the reservoir, a water supply for maintaining said steam generator supplied with water including a water container communicating with the generator, an inlet valve for delivering water to said container, manual adjusting means by which the operator may open or close the inlet valve or set it for any predetermined flow, a gage associated with said manual adjusting means, a float in said water container, electrical mechanism whose circuit is controlled to close the inlet valve only upon an abnormal upward movement of the float, and electrical mechanism whose circuit is controlled to operate the signal only upon an abnormal downward movement of the float.

6. In a machine of the kind described, a filler supply reservoir for the heating and softening of shoe-bottom filler, a steam generator connected to deliver heat and moisture to said filler in the reservoir, a water supply adapted automatically to maintain a substantially constant and predetermined level of water in said steam generator, a manual adjusting means for determining the amount of water supplied, and including a gage to enable the operator to set the supply for any predetermined flow and means for automatically cutting off said water supply upon abnormal rise of water in the generator.

7. In a machine of the class described, a filler supply reservoir for the safe handling with high heat of a heat responsive shoe-bottom filler which is normally slowly penetrable by heat and liable to burn at high heat, a steam generator to which heat is supplied at a substantially predetermined and uniform rate, means for supplying water to the generator comprising a receptacle freely communicating with the generator, means comprising a valve normally set to deliver water to the receptacle at a predetermined rate, means for automatically closing said valve when the rate of flow from the receptacle to the generator falls below normal and for automatically actuating an alarm when the rate of feed of water to the generator falls below the normal predetermined rate.

8. In a machine of the class described, a filler supply reservoir for the safe handling with high heat of a heat responsive shoe-bottom filler which is normally slowly penetrable by heat and liable to burn at high heat, means for uninterruptedly delivering heat and moisture to the filler in the reservoir, said means comprising a steam generator of small capacity in which a substantially constant and predetermined water level is normally maintained, and means adapted to maintain said water level in the generator, said latter means comprising a receptacle, means providing free communication between the generator and receptacle so constructed and arranged that the water level in the generator and receptacle is substantially the same, a water supply, a valve normally set to deliver water from said supply at substantially the same rate at which it is normally evaporated by the generator, an alarm, and means responsive to decrease in the rate of delivery of water to the receptacle for actuating the alarm.

In testimony whereof, I have signed my name to this specification.

ANDREW THOMA.